(12) United States Patent
Kitagawa et al.

(10) Patent No.: US 11,586,217 B2
(45) Date of Patent: Feb. 21, 2023

(54) ROUTE SETTING DEVICE

(71) Applicant: DENSO CORPORATION, Kariya (JP)

(72) Inventors: Nozomi Kitagawa, Kariya (JP); Sei Iguchi, Kariya (JP); Kiyotaka Taguchi, Kariya (JP); Yuji Ota, Kariya (JP); Kazuyoshi Isaji, Kariya (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 16/817,134

(22) Filed: Mar. 12, 2020

(65) Prior Publication Data

US 2020/0209885 A1 Jul. 2, 2020

Related U.S. Application Data

(63) Continuation of application No. PCT/JP2018/037942, filed on Oct. 11, 2018.

(30) Foreign Application Priority Data

Oct. 13, 2017 (JP) .............................. JP2017-199381

(51) Int. Cl.
  *G05D 1/00* (2006.01)
  *G05D 1/02* (2020.01)
  *G01C 21/36* (2006.01)

(52) U.S. Cl.
  CPC ....... *G05D 1/0274* (2013.01); *G01C 21/3676* (2013.01)

(58) Field of Classification Search
  CPC ......... G05D 1/0274; G05D 2201/0213; G05D 1/0088; G05D 1/0212; G05D 1/0061;
  (Continued)

(56) References Cited

U.S. PATENT DOCUMENTS 9,919,648 B1* 3/2018 Pedersen .......... G08G 1/096775
2010/0049428 A1* 2/2010 Murata ................ G09B 29/007
  701/533
(Continued)

FOREIGN PATENT DOCUMENTS

JP  2011118603 A  6/2011
JP  2015-141477 A  8/2015
(Continued)

OTHER PUBLICATIONS

U.S. Appl. No. 16/817,294, filed Mar. 12, 2020, Kitagawa et al.

*Primary Examiner* — Kenneth J Malkowski
*Assistant Examiner* — Carville Albert Hollingsworth, IV
(74) *Attorney, Agent, or Firm* — Harness, Dickey & Pierce, P.L.C.

(57) ABSTRACT

A route setting device includes: a route candidate generation unit that generates multiple route candidates from a current position to a destination; an index calculation unit that calculates, for each of the multiple route candidates, a change index that indicates a probability that an automatic driving system performs a driving change request when a vehicle travels along each of the multiple route candidates by using the automatic driving system; a display unit that associates the multiple candidates with the change index calculated for each of the multiple route candidates, and display the multiple associated route candidates and the associated change index; an input unit that receives a selection among the multiple route candidates by an occupant of the vehicle; and a route setting unit that sets a route among the multiple route candidates based on the selection received by the input unit.

4 Claims, 11 Drawing Sheets

(58) Field of Classification Search
CPC ........... G01C 21/3676; G01C 21/3453; G01C 21/34; B60W 30/18163; B60W 50/14; B60W 50/10; B60W 50/082; B60W 60/005; G08G 1/00; G08G 1/166; B62D 15/0255; G07C 5/008; B60Y 2300/10; G06V 20/588

See application file for complete search history.

(56) References Cited

U.S. PATENT DOCUMENTS

| | | | |
|---|---|---|---|
| 2017/0168489 A1* | 6/2017 | Rander | B60W 40/064 |
| 2017/0315551 A1* | 11/2017 | Mimura | B60W 50/08 |
| 2018/0299281 A1 | 10/2018 | Takashima | |

FOREIGN PATENT DOCUMENTS

| | | |
|---|---|---|
| JP | 2017-078605 A | 4/2017 |
| WO | WO-2019074067 A1 | 4/2019 |

* cited by examiner

ROUTE SETTING DEVICE

CROSS REFERENCE TO RELATED APPLICATION

The present application is a continuation application of International Patent Application No. PCT/JP2018/037942 filed on Oct. 11, 2018, which designated the U.S. and claims the benefit of priority from Japanese Patent Application No. 2017-199381 filed on Oct. 13, 2017. The entire disclosures of all of the above applications are incorporated herein by reference.

TECHNICAL FIELD

The present disclosure relates a route setting device.

BACKGROUND

Currently, vehicles having a limited automatic driving function of maintaining a vehicle lane on a highway are commercialized. In the future, it may be considered to use the automatic driving function not only on the highway but also on an ordinary road. A technology related to the automatic driving on the ordinary road has been proposed.

SUMMARY

One example of the present disclosure provides a route setting device capable of preventing a driving change request from occurring.

According to one example embodiment, a route setting device may generate multiple route candidates, calculate a possibility that an automatic driving system may perform a driving change request, receive a selection among the multiple route candidates; and set a route among the multiple route candidates.

DETAILED DESCRIPTION

Figure 1:
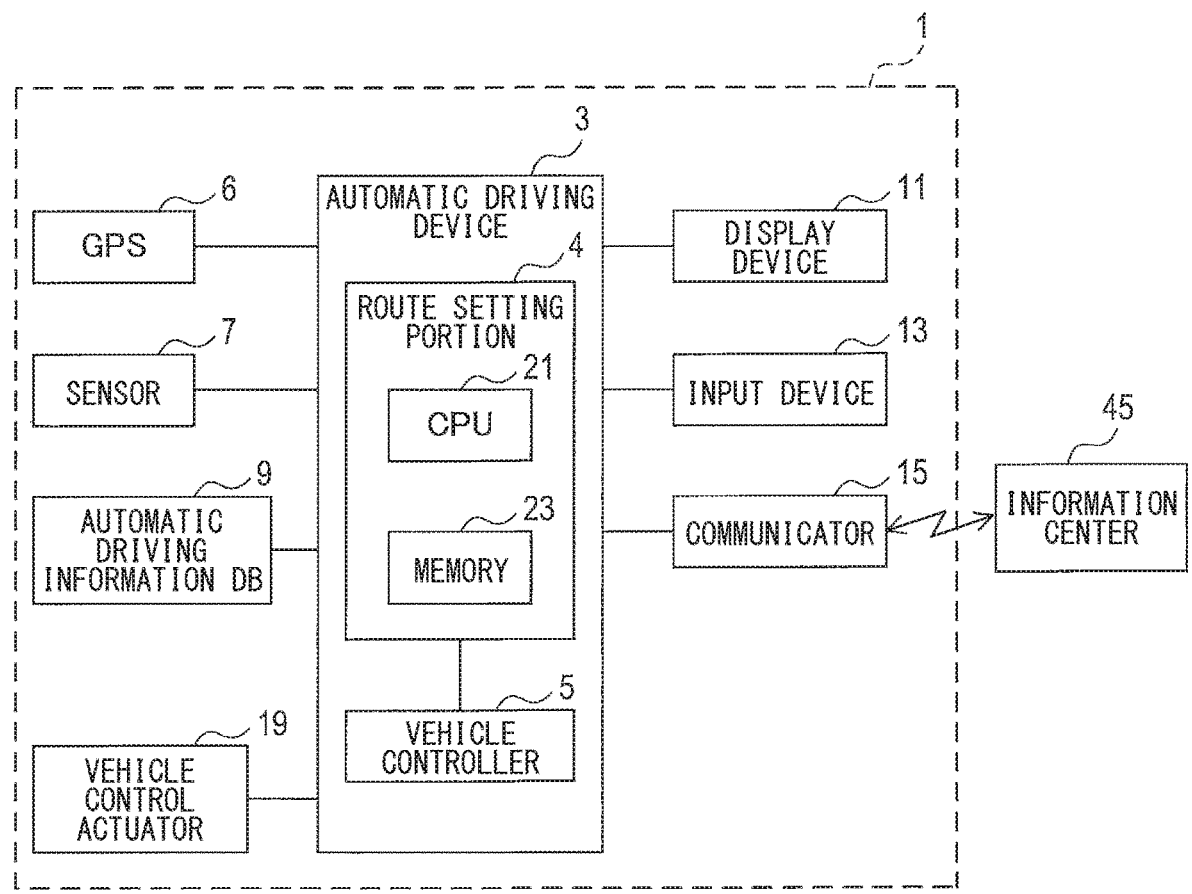
FIG. 1 is a block diagram showing configurations of an in-vehicle system and an automatic driving system.

As a result of detailed studies by the inventors, the following difficulties have been found. A traffic environment of the ordinary road is very complex. Therefore, on the ordinary road, a sensing capability or a process capability of an automatic driving system may cause the automatic driving to be difficult. The automatic driving system performs a driving change request to a driver when determining that it is difficult to continue the automatic driving. When the driver performs a predetermined operation in accordance with the driving change request, a state of a vehicle shifts from a state of the automatic driving to a state of a manual driving.

When the driving change request frequently occurs during the automatic driving, the driver may distrust the automatic driving system, and may not use an automatic driving function. One example provides a route setting device capable of preventing the driving change request from occurring.

According to one example embodiment, a route setting device may include: a route candidate generation unit that may generate multiple route candidates from a current position to a destination; an index calculation unit that may calculate, for each of the multiple route candidates, a change index that may indicate a probability that an automatic driving system may perform a driving change request when a vehicle travels along each of the multiple route candidates by using the automatic driving system; a display unit that may associate the multiple candidates with the change index calculated for each of the multiple route candidates, and may display the multiple associated route candidates and the associated change index; an input unit that may receive a selection among the multiple route candidates by an occupant of the vehicle; and a route setting unit that may set a route among the multiple route candidates based on the selection received by the input unit.

According to one example embodiment, the route setting device calculates the change index for each of the multiple route candidates. The change index corresponds to an index that indicates a probability that the automatic driving system performs the driving change request when the vehicle travels along the route candidate by the automatic driving system.

According to one example embodiment, the route setting device associates the multiple route candidates with the calculated change index for each of the multiple route candidates and displays the associated route candidates and the associated change index. For example, the occupant of the vehicle is able to select a route candidate in which the change index is low among the multiple displayed route candidates.

According to one example embodiment, the route setting device is able to receive the selection of the route candidate by the occupant. According to one example embodiment, the route setting device is able to set the route among the multiple route candidates based on the received selection.

Therefore, according to one example embodiment, the route setting device is able to set to the route, the route candidate in which the change index is low among the multiple route candidates. The automatic driving is performed along the route in which the change index is low, and thereby the driving change request may be prevented from occurring.

According to another example embodiment, a route setting device may include: a memory storing a program; and a microcomputer that may read the program from the memory, and execute a process. The process may include a first process that generates multiple route candidates from a current position to a destination, a second process that may calculate, for each of the multiple route candidates, a change index that may indicate a probability that an automatic driving system may perform a driving change request when a vehicle travels along each of the multiple route candidates by using the automatic driving system, a third process that may associate the multiple route candidates with the change index calculated for each of the multiple route candidates, and may display the multiple associated route candidates and the associated change index; a fourth process that may receive a selection among the multiple route candidates by an occupant of the vehicle, and a fifth process that may set a route among the multiple route candidates based on the selection received in the fourth process.

Hereinafter, embodiments of the present disclosure will be described with reference to the drawings.

First Embodiment

1. Configurations of In-Vehicle System and Automatic Driving Apparatus

Configurations of an in-vehicle system 1 and an automatic driving apparatus 3 will be described with reference to FIG. 1 and FIG. 2. The in-vehicle system 1 and the automatic driving apparatus 3 are mounted on a vehicle. Hereinafter, the vehicle on which the in-vehicle system 1 and the automatic driving apparatus 3 are mounted may be also referred to as a mounted vehicle. The automatic driving apparatus 3 may correspond to an automatic driving system.

As shown in FIG. 1, the in-vehicle system 1 includes the automatic driving apparatus 3, a GPS 6, a sensor 7, automatic driving information DB9, a display device 11, an input device 13, a communicator 15, and a vehicle control actuator 19.

The automatic driving apparatus 3 includes a route setting portion 4 and a vehicle controller 5. The route setting portion 4 includes a microcomputer having a CPU 21 and a semiconductor memory (hereinafter, a memory 23) such as a RAM or a ROM, for example. Each function of the route setting portion 4 may be implemented by the CPU 21 executing a program stored in a non-transitory tangible storage medium. In this example, the memory 23 corresponds to the non-transitory tangible storage medium storing the program. By executing this program, a method in accordance with the program is performed. The route setting portion 4 may include one microcomputer or multiple microcomputers.

Figure 2:
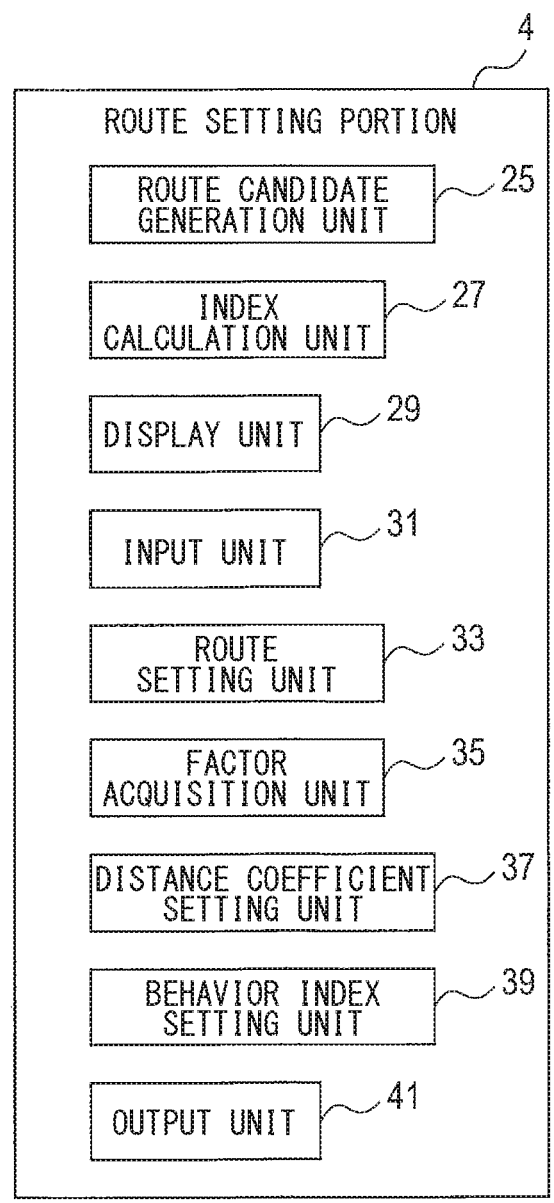
FIG. 2 is a block diagram showing a functional configuration of a route setting portion.
Figure 3:
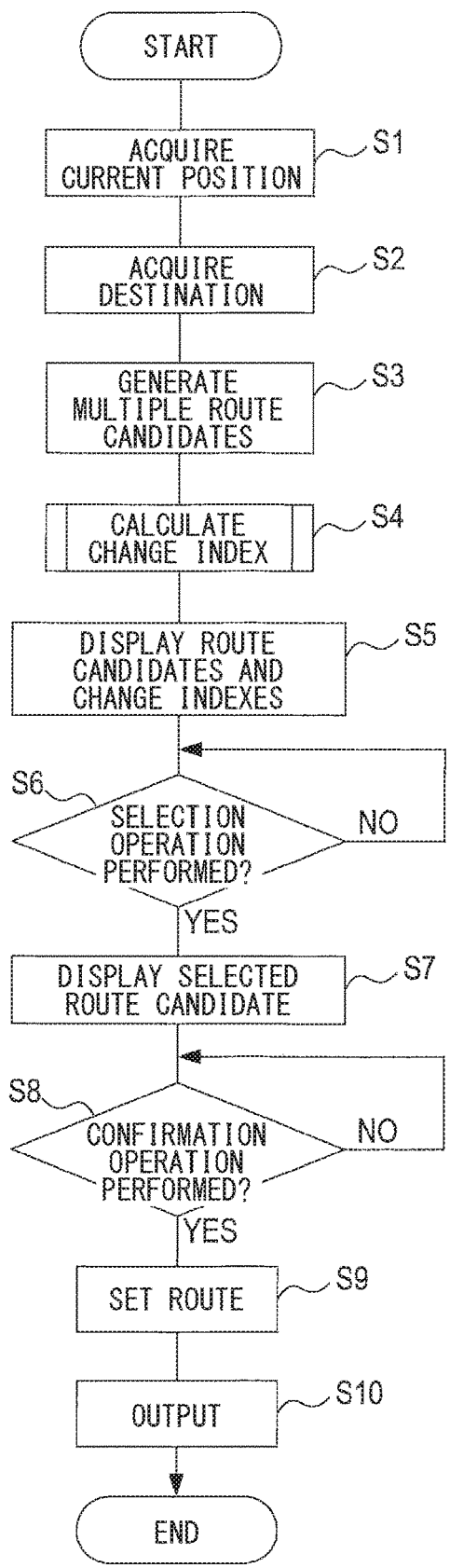
FIG. 3 is a flowchart showing an entire process executed by the route setting portion.

As shown in FIG. 2, the route setting portion 4 includes a route candidate generation unit 25, an index calculation unit 27, a display unit 29, an input unit 31, a route setting unit 33, a factor acquisition unit 35, a distance coefficient setting unit 37, a behavior index setting unit 39, and an output unit 41.

The method of implementing each function of the route setting portion 4 is not limited to software, and a part or all of its functions may be implemented by using one or multiple hardware. For example, when the above-described function may be implemented by an electronic circuit which is hardware, the electronic circuit may be implemented by a digital circuit, an analog circuit, or a combination thereof. The route setting portion 4 may correspond to a route setting device.

The vehicle controller 5 performs the automatic driving along a route set by the route setting portion 4. The vehicle controller 5 controls the vehicle control actuator 19 based on a recognition result of the sensor 7 or the like, and performs the automatic driving. The vehicle controller 5 determines whether it is difficult to continue the automatic driving during the automatic driving. When determining that it is difficult to continue the automatic driving, the vehicle controller 5 performs a driving change request to a driver of the mounted vehicle by using the display device 11. When the driver performs a predetermined operation in accordance with the driving change request, a state of the mounted vehicle shifts from a state of the automatic driving to a state of a manual driving. The vehicle controller 5 may correspond to an automatic driving system.

The GPS 6 acquires position information of the mounted vehicle. The sensor 7 recognizes an environment around the mounted vehicle. The automatic driving information DB9 stores a table (hereinafter, also referred to as a distance coefficient table) that defines a relation between a factor and a distance coefficient K.

The factor affects a probability (hereinafter, also referred to as a change request probability) that the vehicle controller 5 performs the driving change request to the driver during the automatic driving. The factor includes, for example, a date and time factor, a weather factor, a road structure factor, or the like. The day and time factor includes, for example, time, day of the week, or the like. For example, when a traffic amount increases or decreases at a specific time or a specific day of the week, the time or the day of the week affects the recognition result of the sensor 7. As a result, the time or the day of the week affects the change request probability.

The weather factor includes, for example, a distinction between a sunny condition, a cloudy condition, and a rainy condition. Furthermore, the weather factor includes, for example, a rainfall amount. The weather factor affects the recognition result of the sensor 7. As the result, the weather factor affects the change request probability. The change request probability when the weather condition is cloudy is higher than that when the weather condition is sunny. The change request probability when the weather condition is rainy is higher than that when the weather condition is cloudy. Also, the greater the rainfall amount is, the higher the change request probability is.

The road structure factor includes, for example, a distinction between a highway, an automobile road, a national highway, and an ordinary road. The road structure factor includes, for example, a distinction between a straight road and a winding road. The road structure factor includes, for example, a distinction between a road having one lane on each side, a road having two lanes on each side, a road having three or more lanes on each side.

The road structure factor includes, for example, the presence or the absence of a right turn only lane, the presence or the absence of a pedestrian walkway, or the like. The road structure factor includes, for example, the presence or the absence of an intersection, an numeral number of the intersection, the presence or the absence of a pedestrian crosswalk, an numeral number of the pedestrian crosswalk, the presence or the absence of a traffic signal, an numeral number of the traffic signal, or the like. The road structure factor affects the recognition result of the sensor 7 and a control complexity of the vehicle control actuator 19 when the automatic driving is performed. As the result, the road structure factor affects the change request probability.

In the distance coefficient table, as the factor increases the change request probability, the distance coefficient K associated with the factor increases. An example of a relation between the factor and the distance coefficient K in the distance coefficient table will be described below.

When the factor is "the sunny condition" and also "the automobile road", the distance coefficient K is 0.01.

When the factor is "a weak rain with the rainfall amount of 2 mm/h" and also "the automobile road", the distance coefficient K is 0.02.

When the factor is "a strong rain with the rainfall amount of 20 mm/h" and also "the automobile road", the distance coefficient K is 0.1.

When the factor is "the sunny condition" and also "the national highway or the ordinary road", the distance coefficient K is 0.05.

When the factor is "the weak rain with the rainfall amount of 2 mm/h" and also "the national highway or the ordinary road", the distance coefficient K is 0.1.

When the factor is "the strong rain with the rainfall amount of 20 mm/h" and also "the national highway or the ordinary road", the distance coefficient K is 0.5.

The automatic driving information DB9 stores a table (hereinafter, also referred to as a behavior index table) that defines a relation between a behavior type, the factor, and a behavior index PB.

The behavior corresponds to a behavior performed by the mounted vehicle when traveling along the route candidate. The behavior type includes, for example, "a behavior of going straight at the intersection", "a behavior of turning right at the intersection", "a behavior of turning left at the intersection", "a behavior of changing the lane", "a behavior of entering an interchange", or the like. The behavior index table defines the behavior index PB in accordance with a combination of the behavior types and the factors. Thereby, when, in the behavior index table, the behavior type and the factor are identified, the behavior index PB is determined in accordance with the identified behavior type and the identified factor.

In the behavior index table, as the combination of the behavior type and the factor increases the change request probability, the behavior index PB associated with the combination increases.

An example of a relation between the combination of the behavior type and the factor in the behavior index table and the behavior index PB will be described below.

When the behavior type is "the behavior of going straight at the intersection" and the factor is "the sunny condition", the behavior index PB is 0.001.

When the behavior type is "the behavior of going straight at the intersection" and the factor is "the weak rain with the rainfall amount of 2 mm/h", the behavior index PB is 0.002.

When the behavior type is "the behavior of going straight at the intersection" and the factor is "the strong rain with the rainfall amount of 20 mm/h", the behavior index PB is 0.01.

When the behavior type is "the behavior of turning right or left at the intersection" and the factor is "the sunny condition", the behavior index PB is 0.005.

When the behavior type is "the behavior of turning right or left at the intersection" and the factor is "the weak rain with the rainfall amount of 2 mm/h", the behavior index PB is 0.01.

When the behavior type is "the behavior of turning right or left at the intersection" and the factor is "the strong rain with the rainfall amount of 20 mm/h", the behavior index PB is 0.05.

The automatic driving information DB9 stores map information. The map information includes, for example, a road profile, vehicle lane numeral number information, speed limitation information, intersection information, crossing walkway information, or the like. The automatic driving information DB9 stores automatic driving capability road information, planned TOR (take over request) information, or the like.

A part or all of the information stored in the automatic driving information DB9 may be stored in an information center 45 described later.

The display device 11 corresponds to a display placed in a compartment of the mounted vehicle. The display device 11 is able to display an image. The input device 13 is placed in the compartment of the mounted vehicle. The input device 13 receives an operation by an occupant of the mounted vehicle. The occupant may correspond to the driver or an occupant other than the driver. The input device 13 includes, for example, a touch panel, a keyboard, various switches, a voice input device, or the like.

The communicator 15 wirelessly communicates with the information center 45. The information center 45 transmits traffic information, weather information, or the like to the communicator 15. The vehicle control actuator 19 controls a traveling state of the mounted vehicle in accordance with the instruction of the vehicle controller 5.

2. Process Executed by Route Setting Portion

A process executed by the route setting portion 4 will be described with reference to FIGS. 3 to 11. In a S1 of FIG. 3. The route candidate generation unit 25 acquires a current position of the mounted vehicle by using the GPS 6.

In a S2, the route candidate generation unit 25 acquires a destination. The destination may correspond to a destination which the occupant input to the input device 13, or a destination acquired from a scheduler (not shown) or the like.

In a S3, the route candidate generation unit 25 generates multiple route candidates from the current position acquired in the S1 to the destination acquired in the S2, based on the map information stored in the automatic driving information DB9.

Figure 4:
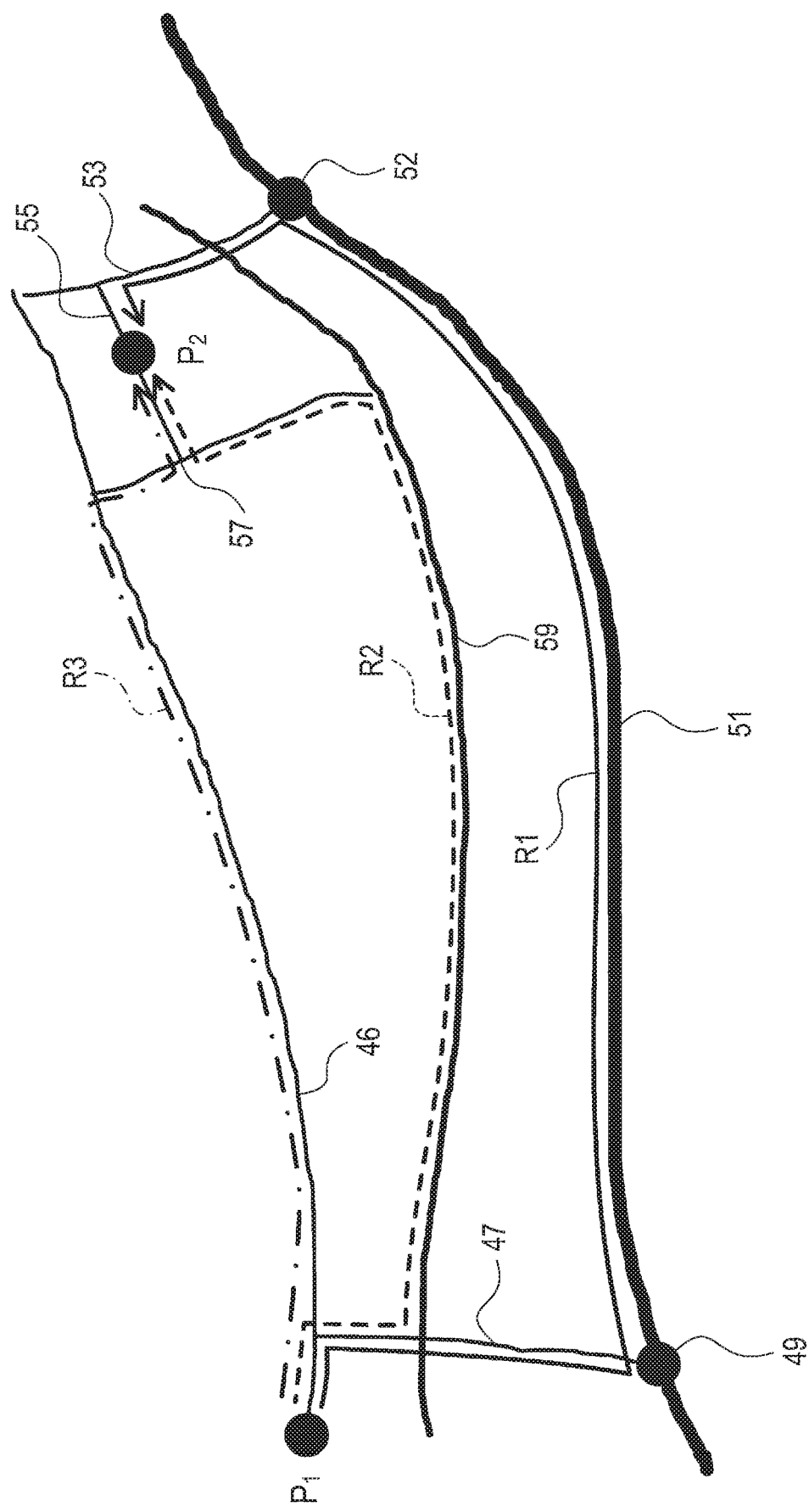
FIG. 4 is an explanatory view illustrating an example of generating route candidates R1 to R3.

FIG. 4 shows a generation example of the route candidates. In this example, the route candidate generation unit 25 generates route candidates R1, R2, and R3 from a current position P1 to a destination P2. The route candidate R1 corresponds to a route candidate through ordinary roads 46 and 47, an interchange 49, a highway 51, an interchange 52, and ordinary roads 53 and 55 in order. The route candidate R2 corresponds to a route candidate through the ordinary road 46, an ordinary road 57, and the ordinary road 55 in order. The route candidate R3 corresponds to a route candidate through the ordinary roads 46 and 47, a national highway (or national road) 59, the ordinary roads 57 and 55 in order.

Returning to FIG. 3, in a S4, the factor acquisition unit 35, the index calculation unit 27, the distance coefficient setting unit 37, and the behavior index setting unit 39 calculate a change index for each of the multiple route candidates generated in the S3. The change index corresponds to an index that indicates the change request probability when the vehicle travels along the route candidate. As the change request probability increases, the change index increase.

Figure 5:
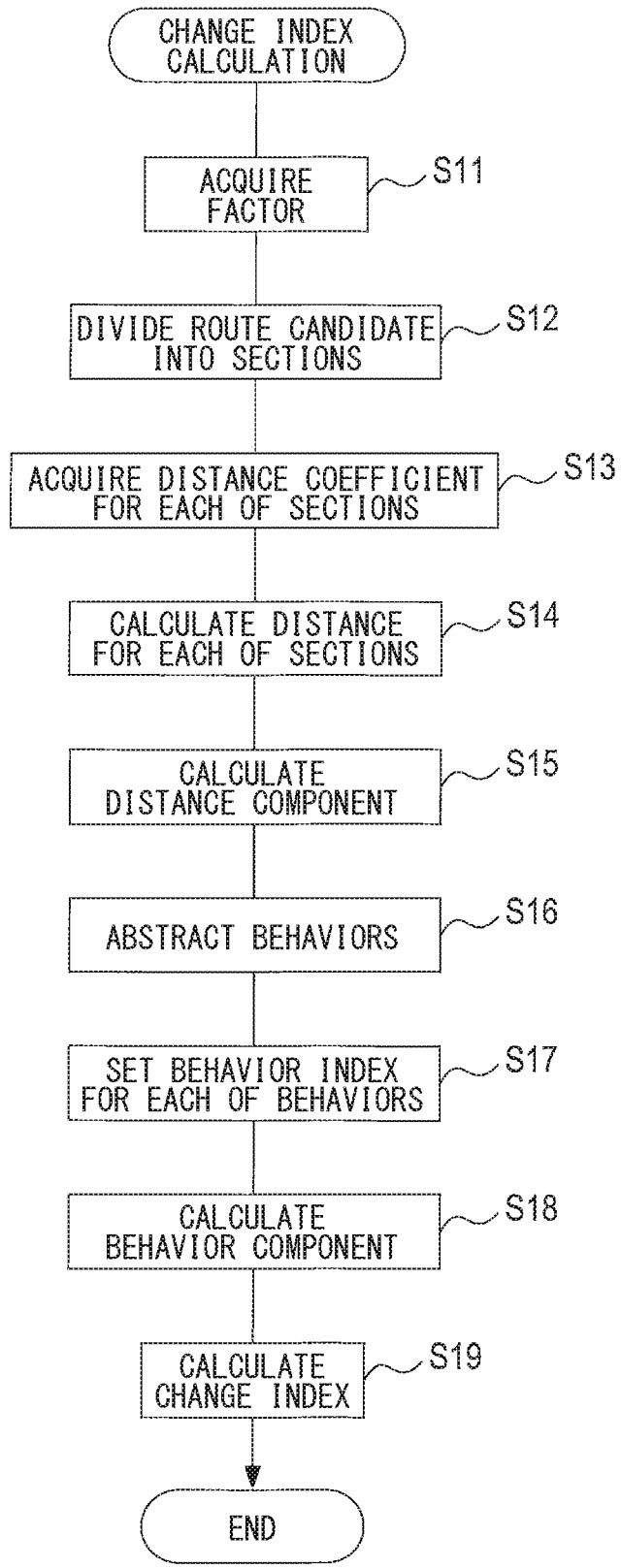
FIG. 5 is a flowchart showing a change index calculation process executed by the route setting portion.

A process of the S4 will be described in detail with reference to FIG. 5. The factor acquisition unit 35, the index calculation unit 27, the distance coefficient setting unit 37, and the behavior index setting unit 39 execute a process shown in FIG. 5 for each of the multiple route candidates. In a S11 of FIG. 5, the factor acquisition unit 35 acquires the factor in the route candidate. The acquired factor includes, for example, the data and time factor, the weather factor, the road structure factor, or the like. When the factor differs depending on the locations in the route candidate, the factor acquisition unit 35 acquires the factor in each of the locations.

The factor acquisition unit 35 is able to acquire, for example, the date and time factor from a clock (not shown). The factor acquisition unit 35 is able to acquire the weather information from the information center 45 by using the communicator 15, and acquire the weather factor from the weather information. The factor acquisition unit 35 is able to acquire the road structure factor from the map information stored in the automatic driving information DB9.

Figure 6:
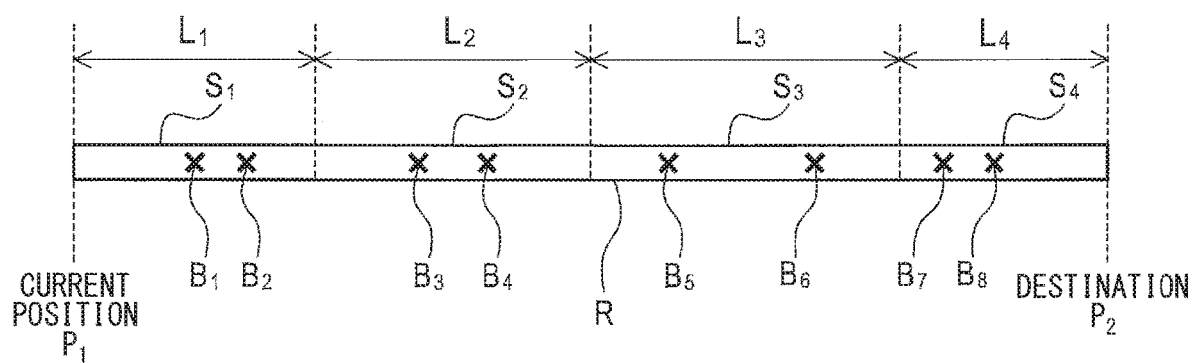
FIG. 6 is an explanatory view illustrating a method of calculating a change index for a route candidate R.

In a S12, the index calculation unit 27 divides the route candidate into at least one section in accordance with the factor. In each section, the factors are same. FIG. 6 shows an example in which the route candidate is divided. In this example, the index calculation unit 27 divides the route candidate R into sections $S_1$ to $S_4$. In the section $S_1$, all the factors are same. The similar applies to the sections $S_2$ to $S_4$.

In the S13, the distance coefficient setting unit 37 sets, for each of the sections obtained by the division in the S12, the distance coefficient K based on the factor in the section. That is, the distance coefficient setting unit 37 checks the factor in the section by comparing with the distance coefficient table, and sets the distance coefficient K in the section. In the example of FIG. 6, the distance coefficient setting unit 37 checks the factor in the section $S_1$ by comparing with the distance coefficient table, and sets a distance coefficient $K_1$ in the section $S_1$. Similarly, the distance coefficient setting unit 37 sets distance coefficients $K_2$ to $K_4$ in the sections $S_2$ to $S_4$, respectively.

In a S14, the index calculation unit 27 calculates the distance of each section divided in the S12. In the example shown in FIG. 6, the index calculation unit 27 calculates a distance $L_1$ of the section $S_1$, a distance $L_2$ of the section $S_2$, a distance $L_3$ of the section $S_3$, and a distance $L_4$ of the section $S_4$.

In a S15, the index calculation unit 27 calculates a distance component $P_L$ among change indexes P, based on an equation (1).

$$P_L = \Sigma_{i=1}^{m} K_i L_i \qquad \text{Equation (1)}$$

The distance component $P_L$ corresponds to a value obtained by integrating values obtained by multiplying the section distance Li by the distance coefficient Ki for all the sections. The distance $L_i$ corresponds to a distance of the section $S_i$. The distance coefficient $K_i$ corresponds to a coefficient in the section $S_i$. The i corresponds to a natural number of 1 or more. The m corresponds to a numeral number of the section in the route candidate.

In a S16, the index calculation unit 27 extracts a behavior B in the route candidate. The extracted behavior B corresponds to a behavior associated with the behavior index PB in the behavior index table. In the example shown in FIG. 6, the index calculation unit 27 extracts behaviors $B_1$ to $B_8$.

In a S17, the behavior index setting unit 39 identifies the factor at the location of the behavior B for each behavior B extracted in the S16. In the example shown in FIG. 6, the behavior index setting unit 39 identifies the factor at the location of the behavior $B_1$. Similarly, the behavior index setting unit 39 identifies the factors at the locations of the behaviors $B_2$ to $B_8$.

Next, the behavior index setting unit 39 sets the behavior index PB based on the behavior type and the factor at the location of the behavior for each behavior B extracted in the S16. That is, the behavior index setting unit 39 checks the combination of the type of the behavior B and the factor at the location of the behavior B by comparing with the behavior index table, and thereby sets the behavior index PB of the behavior B.

In the example shown in FIG. 6, the behavior index setting unit 39 checks the combination of the type of the behavior $B_1$ and the factor at the location of the behavior $B_1$ by comparing with the behavior index table, and thereby sets the behavior index PB of the behavior $B_1$. Similarly, the behavior index setting unit 39 sets the behavior indexes $PB_2$ to $PB_8$ for the behaviors $B_2$ to $B_8$, respectively.

In a S18, the index calculation unit 27 calculates a behavior component $P_B$ among the change indexes P, based on an equation (2).

$$P_B = \Sigma_{j=1}^{n} PB_j \qquad \text{Equation (2)}$$

The behavior component PB corresponds to a value obtained by integrating, for each behavior, the behavior index $PB_j$ set in the S17. The behavior index $PB_j$ corresponds to a behavior index of the behavior $B_j$. The j corresponds to a natural number from 1 to n. The n corresponds to a numeral number of the behavior B in the route candidate. In the example shown in FIG. 6, the behavior component $P_B$ corresponds to a value obtained by integrating the behavior indexes $PB_1$ to $PB_8$.

In a S19, the index calculation unit 27 calculates the change index P by adding the distance component $P_L$ calculated in the S15 to the behavior component $P_B$ calculated in the S18 as shown in an equation (3).

$$P = P_L + P_B \qquad \text{Equation (3)}$$

Returning to FIG. 3, in a S5, the display unit 29 displays the multiple route candidates generated in the S3 on the display device 11. The display unit 29 displays the change index of each route candidate calculated in the S4 on the display device 11 in association with the route candidate.

Figure 7:
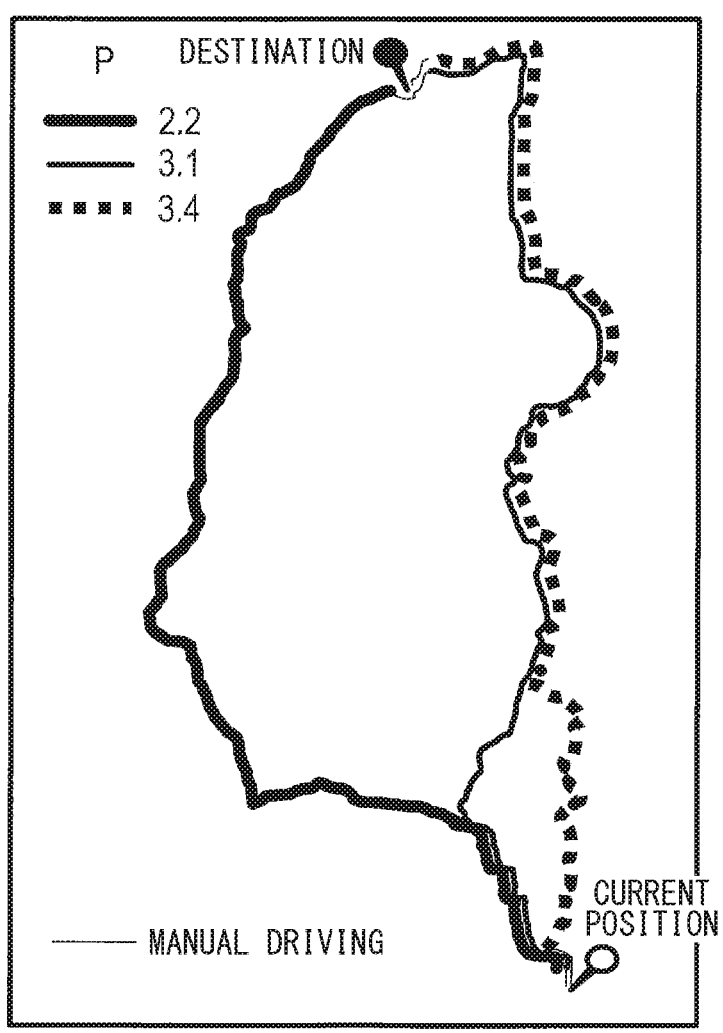
FIG. 7 is an explanatory view illustrating a case example in which the route candidate is displayed by a display device.
Figure 8:
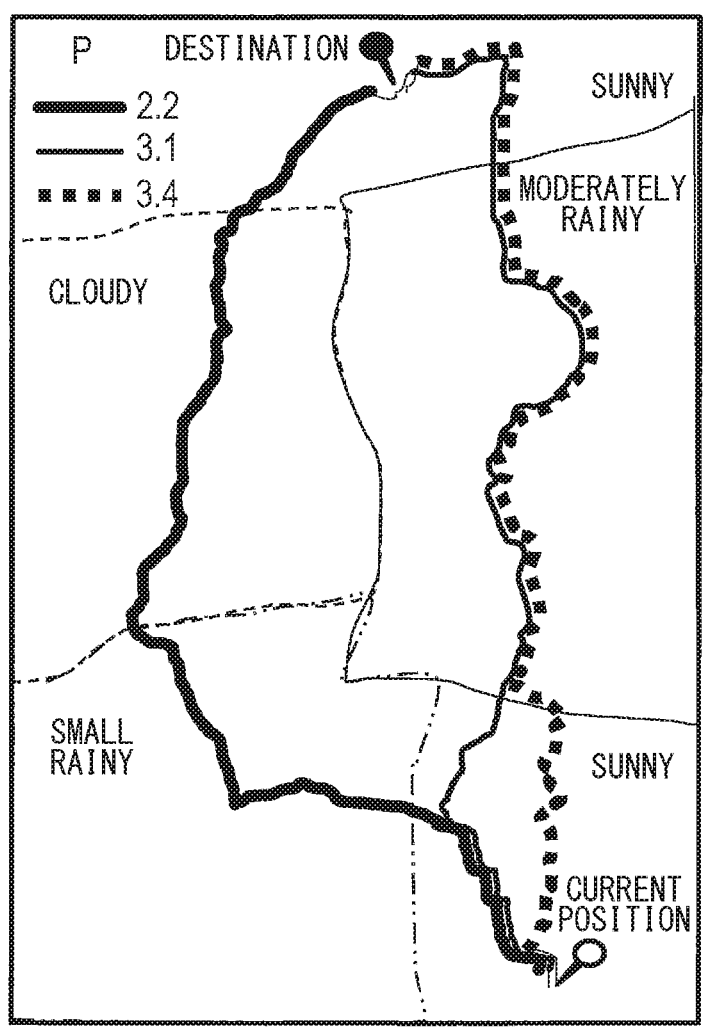
FIG. 8 is an explanatory view illustrating a case example in which the route candidate is displayed by the display device.

FIGS. 7 and 8 show examples of the displays by the display device 11. The displays shown in FIG. 7 and FIG. 8 show the multiple route candidates and the change indexes in accordance with each of the route candidates. The display shown in FIG. 8 further shows a weather forecast for each region. In the display by the display device 11, for example, the multiple route candidates may be identifiable by color or line form.

Figure 9:
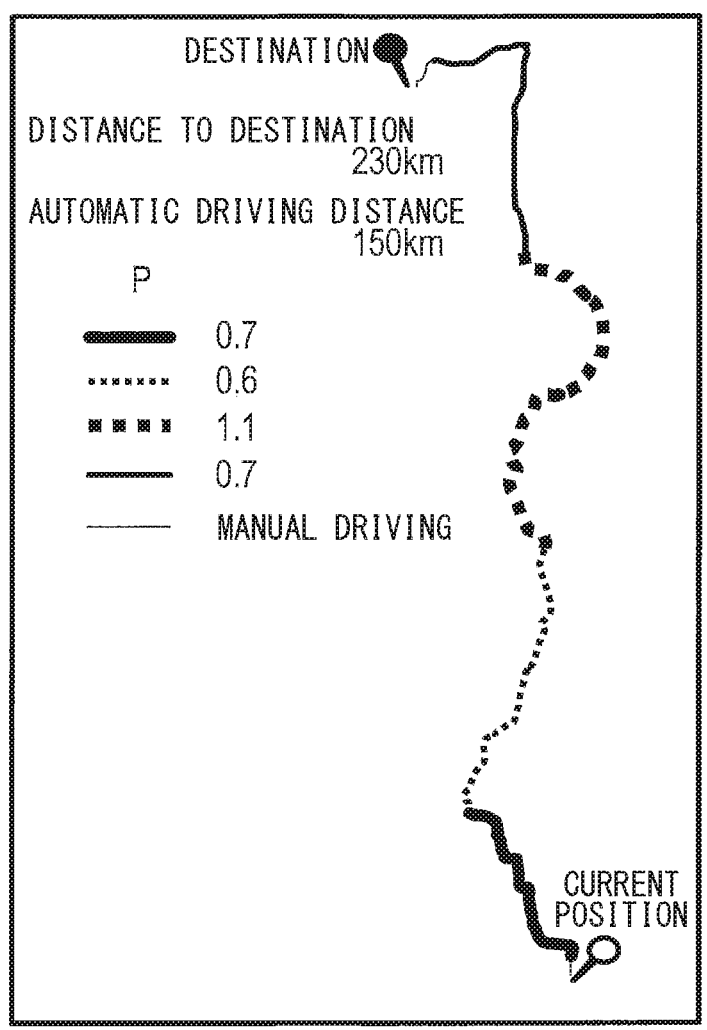
FIG. 9 is an explanatory view illustrating a case example in which the route candidate is displayed by the display device.
Figure 10:
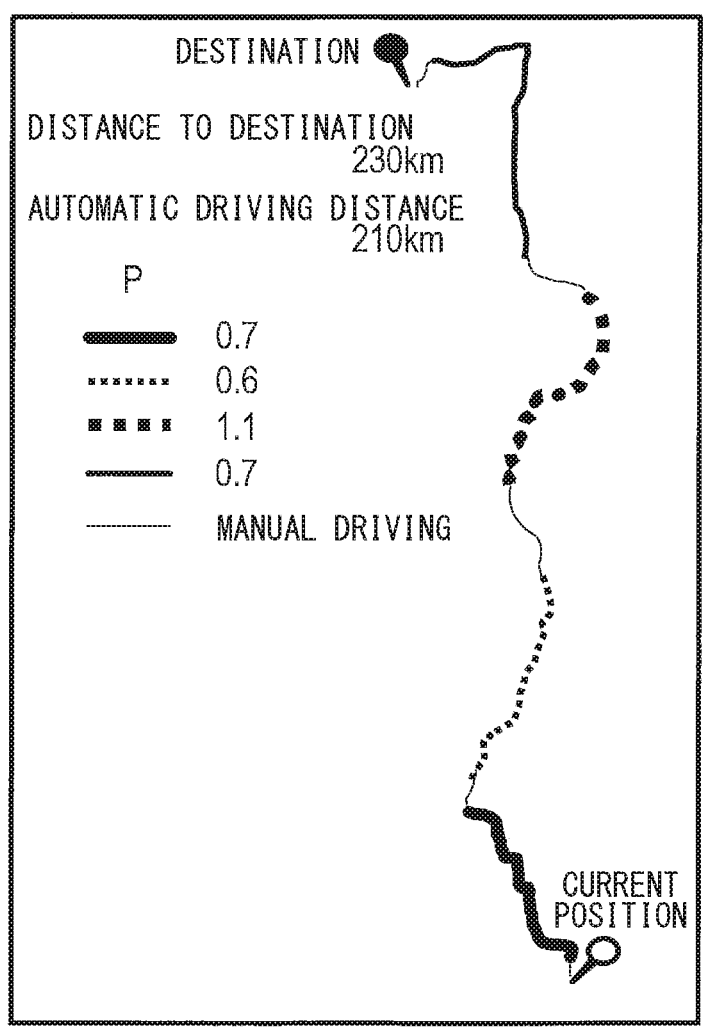
FIG. 10 is an explanatory view illustrating a case example in which the route candidate is displayed by the display device.
Figure 11:
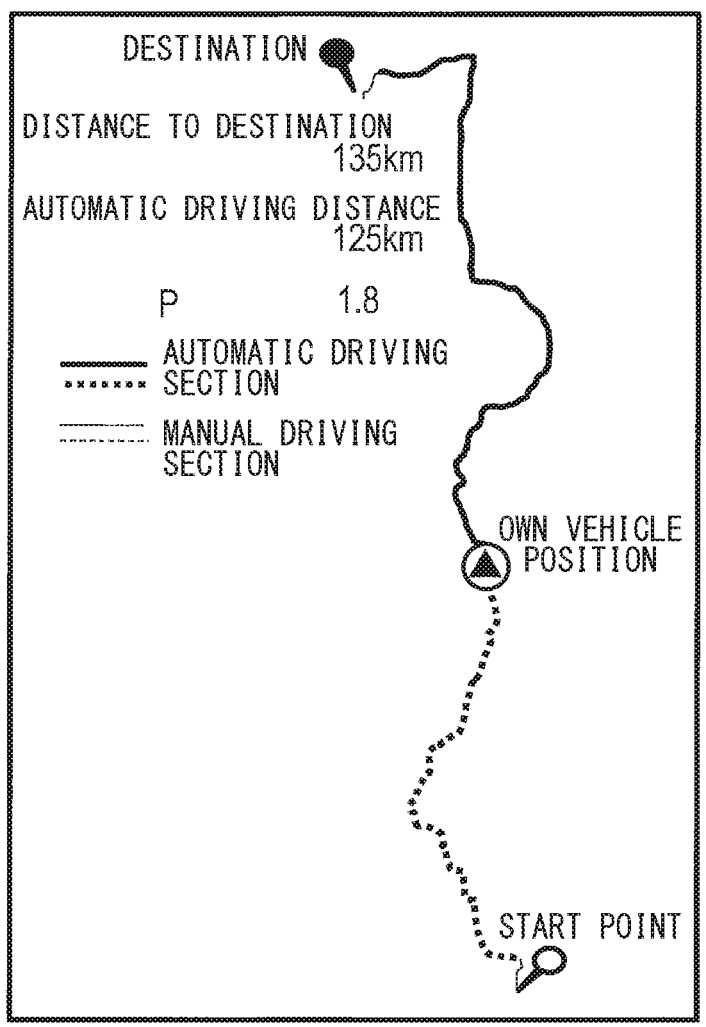
FIG. 11 is an explanatory view illustrating a case example in which the route candidate is displayed by the display device during the automatic driving.

In the display by the display device 11, as shown in FIGS. 9 and 10, one route candidate may be divided into multiple sections to be displayed, and the change index for each of the sections may be shown. A method of dividing the route candidate includes, for example, a method of diving at every certain distance, a method of dividing in accordance with the road structure, a method of dividing into an automatic driving section and a manual driving section, or the like. In the display by the display device 11, for example, the multiple sections may be identifiable by color or line form.

In the route candidate, the automatic driving may be performed except for a vicinity of the current position and the destination as shown in FIG. 9. In the route candidate, as shown in FIG. 10, a section capable of the automatic driving and a section incapable of the automatic driving and capable of the manual driving may be mixed.

In a S6, the input unit 31 determines whether the occupant performs a selection operation to the input device 13. The selection operation corresponds to an operation for selecting one route candidate among the multiple route candidates displayed on the display device 11 in the S5. When the selection operation is performed, the input unit 31 receives the selection operation, and the process proceeds to a S7. On the other hand, when the selection operation is not performed, the process returns to the S6.

In the S7, the display unit 29 displays the route candidate selected by the selection operation on the display device 11.

In a S8, the input unit 31 determines whether a confirmation operation is performed on the input device 13. The confirmation operation corresponds to an operation for confirming that the route candidate displayed in the S7 is set to the route. When the confirmation operation is performed, the process proceeds to a S9. When the confirmation operation is not performed, the process returns to the S8.

In the S9, the route setting unit 33 sets the route candidate displayed on the display device 11 in the S7 to the route.

In a S10, the output unit 41 outputs the route set in the S9 to the vehicle controller 5. The vehicle controller 5 performs the automatic driving along the output route. The display unit 29 may perform, for example, the display shown in FIG. 11 on the display device 11 during the automatic driving. In this display, the display unit 29 shows, in the route, a distance from the current position of the mounted vehicle to the destination, an automatic driving distance, and the change index P in the remaining automatic driving section.

The automatic driving distance may mean a distance from the current position to a point where the planned driving change occurs. The display unit 29 may further display a prediction time of arrival at the destination or a prediction requirement time to the destination on the display device 11. The display unit 29 is capable of expressing the prediction time and the prediction requirement time by, for example, a picture imitating an analog clock. The display unit 29 may not display a portion that has already been passed in the route on the display device 11. The display unit 29 may display an enlarged view showing a periphery of the current position of the mounted vehicle on the display device 11.

3. Effect Provided by Route Setting Portion (1A) The route setting portion 4 calculates the change index for each of the multiple route candidates. The change index indicates the change request probability. The route setting portion 4 associates the multiple route candidates with the calculated change index for each of the multiple route candidates and displays the associated route candidates and the associated change index. The occupant of the mounted vehicle is able to, for example, select the route candidate in which the change index is low among the multiple displayed route candidates. The route setting portion 4 sets the route among the multiple route candidates based on the selection of the route candidate.

Therefore, the route setting portion 4 is able to set to the route, the route candidate in which the change index is low among the multiple route candidates. The automatic driving is performed along the route in which the change index is low, and thereby the driving change request may be prevented from occurring.

(1B) The route setting portion 4 calculates the change index based on the value obtained by multiplying the distance in the route candidate by the distance coefficient. Therefore, the change index corresponds to an index that more accurately reflects the change request probability. As the result, based on the change index, it becomes easier to select the route candidate in which the driving change request hardly occurs.

(1C) The route setting portion 4 acquires the factor that affects the change request probability. The route setting portion 4 sets the distance coefficient based on the factor. Therefore, the change index corresponds to an index that more accurately reflects the change request probability. As the result, based on the change index, it becomes easier to select the route candidate in which the driving change request hardly occurs.

(1D) The route setting portion 4 calculates the change index based on the value obtained by integrating the behavior index for each behavior. The behavior index corresponds to an index associated in advance with the behavior performed by the mounted vehicle when the mounted vehicle travels along the route candidate. Therefore, the change index corresponds to an index that more accurately reflects the change request probability. As the result, based on the change index, it becomes easier to select the route candidate in which the driving change request hardly occurs.

(1E) The route setting portion 4 acquires the factor that affects the change request probability. The route setting portion 4 sets the behavior index based on the behavior type and the factor at the location of the behavior. Therefore, the change index corresponds to an index that more accurately reflects the change request probability. As the result, based on the change index, it becomes easier to select the route candidate in which the driving change request hardly occurs.

(1F) The factor acquired by the route setting portion 4 corresponds to a factor selected from a group including the time and date, the weather, and the road structure. These factors have a large influence on the change request probability. The route setting portion 4 calculates the change index in consideration of these factors. Therefore, the change index corresponds to an index that more accurately reflects the change request probability. As the result, based on the change index, it becomes easier to select the route candidate in which the driving change request hardly occurs.

4. Other Embodiments

While the embodiment of the present disclosure has been described, the present disclosure is not limited to the embodiment described above and can be modified in various manners.

(1) The index calculation unit 27 may not calculate the distance component $P_L$ but may use the behavior component $P_B$ as the change index P. Even in this case, it may be possible to achieve the effects of (1A) and (1D). The index calculation unit 27 may not calculate the behavior component $P_B$ but may use the distance component $P_L$ as the change index P. Even in this case, it may be possible to achieve the effects of (1A) and (1B).

(2) The distance coefficient K may correspond to a fixed value that is not affected by the factor. Even in this case, it may be possible to achieve the effects of (1A) and (1B). The behavior index PB may correspond to a value that is not affected by the factor and is unequivocally determined by the behavior type. Even in this case, it may be possible to achieve the effects of (1A) and (1D).

(3) The factor may correspond to one or two factors selected from a group including the time and date, the weather, and the road structure. Even in this case, it may be possible to achieve the effects of (1A) to (1F).

(4) The route setting portion 4 may correspond to a device independent of the vehicle controller 5. Even in this case, it may be possible to achieve the effects of (1A) to (1F).

(5) The route setting portion 4 may correct the change index P in accordance with an accuracy of a map DB used for the vehicle control of the automatic driving. This will be described below. The route setting portion 4 determines, in accordance with the accuracy of the map DB, a correction constant $C_L$ for the distance component $P_L$ and a correction constant $C_B$ for the behavior component $P_B$. A value obtained by multiplying the distance component $P_L$ by the correction constant $C_L$ corresponds to the corrected distance component $P_L$. A value obtained by multiplying the behavior component $P_B$ by the correction constant $C_B$ corresponds to the corrected behavior component $P_B$.

The route setting portion 4 may discriminate the map DB. For example, the route setting portion may discriminate a manufacturer provision map DB or a manufacturer authentication map DB from a non-authentication map DB. When the map DB used for the vehicle control of the automatic driving is the non-authentication map DB, the route setting portion 4 is able to cause the automatic driving not to function.

(6) The route setting portion 4 may correct the change index P in accordance with a situation related to availability or non-availability of a GPS satellite. This will be described below. The situation related to the availability or the non-availability of the GPS satellite includes, for example, a situation (hereinafter, also referred to as a first situation) in which the factor obstructs the GPS satellite continues for a long time and a traveling route branches on the way, such as regions where high building groups are gathered, mountain roads, or the like. The situation related to the availability or the non-availability of the GPS satellite includes, for example, a situation (hereinafter, also referred to as a second situation) in which a short tunnel, an independent high building or the like exists.

The route setting portion 4 determines, in accordance with the situation related to the availability or the non-availability of the GPS satellite, the correction constant $C_L$ for the distance component $P_L$ and the correction constant $C_B$ for the behavior component $P_B$. For example, the correction constant $C_L$ becomes larger as a degree of the first situation becomes more significant. For example, the correction constant $C_B$ becomes larger as a degree of the second situation becomes more significant. A value obtained by multiplying the distance component $P_L$ by the correction constant $C_L$ corresponds to the corrected distance component $P_L$. A value obtained by multiplying the behavior component $P_B$ by the correction constant $C_B$ corresponds to the corrected behavior component $P_B$.

(7) The route setting portion 4 may change the change index P in accordance with a travel record distance. The example will be described below. The route setting portion 4 has a function of integrating a distance (hereinafter, also referred to as an automatic driving distance X) traveled by the mounted vehicle by the automatic driving and a function of storing a numeral number $N_{tor}$ of the performed driving change request.

The change index P when automatic driving distance X is 0 km is set to a $P_{df}$. The route setting portion 4 updates the change index P based on the following equation (4) every time the automatic driving distance X increases by a certain distance. The certain distance is, for example, 100 km.

$$P=N_{tor}/X \qquad \text{Equation (4)}$$

Alternatively, the route setting portion 4 may update the change index P based on the equation (4) every time the driving change request occurs. However, the route setting portion 4 does not update the change index P even when the driving change request occurs until the automatic driving distance X reaches a certain distance. The certain distance is, for example, 100 km. This is because the value may not match the actual situation when the change index is updated in a state where the automatic driving distance X is short.

The route setting portion 4 may update the change index P based on the following equation (5) instead of the equation (4) described above.

$$P=(N_{tor}+N_{df})/(X+X_{df}) \qquad \text{Equation (5)}$$

In the equation (5), the $N_{df}$ and the $X_{df}$ correspond to default values.

(8) The route setting portion 4 may change the driving change index based on a travel record location. The example will be described below. The route setting portion 4 has a function of integrating a numeral number of a time when the mounted vehicle has passed a predetermined road structure (hereinafter, also referred to as a passing number Y) and the function of storing the numeral number $N_{tor}$ of the performed driving change request. When the passing number Y is 0, the change index P is set to the $P_{df}$.

The route setting portion 4 updates the change index P based on the following equation (6) every time the passing number Y increases by a certain time. The certain time corresponds to a natural number of 1 or more.

$$P=N_{tor}/N \qquad \text{Equation (6)}$$

Alternatively, the route setting portion 4 may update the change index P based on the equation (6) every time the driving change request occurs by a certain number of times. The certain time corresponds to a natural number of 1 or more. However, the route setting portion 4 does not update the change index P even when the driving change request occurs the certain number of times until an accumulative number of occurrence times of the driving change request reaches a predetermined threshold value. The threshold value is, for example, 10 times. This is because the value may not match the actual situation when the change index is updated in a state where the accumulative number of occurrence times of the driving change request is small.

(9) Multiple functions of one configuration element in the above embodiment may be implemented by multiple configuration elements, or a single function of one configuration element may be implemented by multiple configuration elements. Further, multiple functions of multiple configuration elements may be implemented by one configuration element, or one function implemented by multiple configuration elements may be implemented by one configuration element. A part of the configuration of the above embodiment may be omitted. At least a part of the configuration of the above embodiment may be added to or replaced with another configuration of the above embodiment.

(10) In addition to the route setting device described above, various features such as a system having the route setting device as a configuration element, a program for making a computer function as the route setting device, a non-transitory tangible storage medium such as a semiconductor memory in which the program is stored, and a method of route setting may be provided to implement the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes multiple sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A route setting device comprising: a memory storing a program; and a microcomputer configured to read the program from the memory and execute a process, wherein
the process includes
a first process that generates a plurality of route candidates from a current position to a destination,
a second process that calculates, for each of the plurality of route candidates, a change index that indicates a probability that an automatic driving system performs a driving change request when a vehicle travels along the each of the plurality of route candidates by using the automatic driving system,
a third process that
associates the each of the plurality of route candidates with the change index calculated for the each of the plurality of route candidates, and
displays the plurality of associated route candidates and the associated change index;
a fourth process that receives a selection among the plurality of route candidates by an occupant of the vehicle,
a fifth process that sets a route among the plurality of route candidates based on the selection received in the fourth process, and
a sixth process that outputs the route set in the fifth process to a vehicle controller that performs an automatic driving of the vehicle along the route, wherein
the second process further includes
acquiring a plurality of factors that affect the probability, the plurality of factors including a time and date, a weather, and a road structure, wherein the factor corresponding to the road structure includes information indicating presence or absence of a pedestrian walkway, presence or absence of a pedestrian crosswalk, and a numeral number of the pedestrian crosswalk,
setting a distance coefficient based on the plurality of factors, and
calculating the change index based on a value obtained by multiplying a distance in each of the plurality of route candidates by the distance coefficient in the each of the plurality of route candidates.

2. The route setting device according to claim 1, wherein the second process further includes
dividing the each of the plurality of route candidates into at least one section, and
setting the distance coefficient by comparing the plurality of factors that affect the probability in the at least one section with a distance coefficient table that defines a relation between the plurality of factors and the distance coefficient,
in the distance coefficient table, the distance coefficient associated with the plurality of factors increases as the associated plurality of factors increase the probability.

3. The route setting device according to claim 1, wherein the second process further includes
extracting a plurality of behaviors in each of the plurality of route candidates,
acquiring a plurality of behavior indexes for the plurality of behaviors, respectively, by referring a behavior index table that defines the plurality of behavior indexes in accordance with a combination of a behavior type and the plurality of factors, and
calculating the change index based on a value obtained by integrating each of the plurality of behavior indexes, and
the each of the plurality of behavior indexes is associated in advance with the each of the plurality of behaviors performed by the vehicle when the vehicle travels along the each of the plurality of route candidates.

4. The route setting device according to claim 1, wherein the second process sets the distance coefficient by comparing the plurality of factors that affect the probability with a distance coefficient table that defines a relation between the plurality of factors and the distance coefficient.

* * * * *